(12) United States Patent
Gupta et al.

(10) Patent No.: US 10,352,301 B2
(45) Date of Patent: Jul. 16, 2019

(54) METHOD FOR OPERATING A WIND POWER PLANT IN A WEAK GRID ENVIRONMENT AND A WIND POWER PLANT

(71) Applicant: VESTAS WIND SYSTEMS A/S, Aarhus N (DK)

(72) Inventors: Manoj Gupta, Singapore (SG); Ravi Kumar, Sengkang (SG)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 15/521,573

(22) PCT Filed: Sep. 23, 2015

(86) PCT No.: PCT/DK2015/050291
§ 371 (c)(1),
(2) Date: Apr. 24, 2017

(87) PCT Pub. No.: WO2016/062316
PCT Pub. Date: Apr. 28, 2016

(65) Prior Publication Data
US 2017/0314534 A1 Nov. 2, 2017

(30) Foreign Application Priority Data

Oct. 24, 2014 (DK) .................................. 2014 70650

(51) Int. Cl.
*F03D 7/04* (2006.01)
*F03D 7/02* (2006.01)
(Continued)

(52) U.S. Cl.
CPC ............ *F03D 7/048* (2013.01); *F03D 7/0284* (2013.01); *F03D 9/257* (2017.02); *H02J 3/16* (2013.01);
(Continued)

(58) Field of Classification Search
CPC ........ F03D 7/048; F03D 9/257; F03D 7/0284; H02J 3/16; H02J 3/386; H02J 2003/001; Y02E 10/723; Y02E 10/725; Y02E 10/763; Y02E 40/34

USPC ........................................... 290/44
See application file for complete search history.

(56) References Cited

U.S. PATENT DOCUMENTS

2010/0332040 A1* 12/2010 Garcia .................. F03D 7/0284
700/287
2012/0101640 A1 4/2012 Stapelfeldt
(Continued)

FOREIGN PATENT DOCUMENTS

EP 2463979 A1 6/2012
EP 2711543 A1 3/2014
(Continued)

OTHER PUBLICATIONS

Danish Search Report for PA 2014 70650, dated May 26, 2015.
International Search Report for PCT/DK2015/050291, dated Dec. 8, 2015.

*Primary Examiner* — Charles Reid, Jr.
(74) *Attorney, Agent, or Firm* — Patterson + Sheridan, LLP

(57) ABSTRACT

A method of operating a wind power plant in a weak grid environment is provided to achieve desired system stability criteria and to support an electrical grid during disturbances or faults. The wind power plant is coupled to an electrical grid, and includes a power plant controller for controlling a plurality of wind turbine generators. The method includes, when a weak grid criterion is fulfilled, setting the power plant controller to operate in a weak grid mode by providing, when a grid voltage deviates beyond a threshold voltage, a reduced active power reference to the plurality of wind turbine generators. The method further includes, when the electrical grid recovers, generating a reduced amount of active power based on the reduced active power reference.

19 Claims, 6 Drawing Sheets

(51) Int. Cl.
*F03D 9/25* (2016.01)
*H02J 3/16* (2006.01)
*H02J 3/38* (2006.01)
*H02J 3/00* (2006.01)

(52) U.S. Cl.
CPC ......... *H02J 3/386* (2013.01); *H02J 2003/001* (2013.01); *Y02E 10/723* (2013.01); *Y02E 10/725* (2013.01); *Y02E 10/763* (2013.01); *Y02E 40/34* (2013.01)

(56) References Cited

U.S. PATENT DOCUMENTS

| | | | |
|---|---|---|---|
| 2013/0015660 A1 | 1/2013 | Hesselbaek et al. | |
| 2014/0021720 A1* | 1/2014 | Nelson | H02J 3/386 290/44 |
| 2014/0138949 A1* | 5/2014 | El Moursi | H02P 9/10 290/44 |
| 2014/0159367 A1* | 6/2014 | Yin | F03D 7/028 290/44 |

FOREIGN PATENT DOCUMENTS

| | | |
|---|---|---|
| WO | 2011/050807 A2 | 5/2011 |
| WO | 2013044927 A1 | 4/2013 |
| WO | 2013185772 A2 | 12/2013 |
| WO | 2014009223 A2 | 1/2014 |
| WO | 2014012789 A1 | 1/2014 |
| WO | 2014124644 A1 | 8/2014 |

\* cited by examiner

METHOD FOR OPERATING A WIND POWER PLANT IN A WEAK GRID ENVIRONMENT AND A WIND POWER PLANT

TECHNICAL FIELD

The present disclosure describes embodiments generally relating to a method for operating a wind power plant. Embodiments can provide for a method for operating a wind power plant in a weak grid environment. The present disclosure also describes a wind power plant configured to carry out such a method of operating a wind power plant.

BACKGROUND

The development and acceptance of wind energy as a clean and productive source of alternative energy is proliferating. Wind energy can be captured by a wind turbine generator, which is a rotating machine that converts the kinetic energy of the wind into mechanical energy, and the mechanical energy subsequently into electrical power. Common horizontal-axis wind turbines include a tower, a nacelle located at the apex of the tower, and a rotor that is supported in the nacelle by means of a shaft. The shaft couples the rotor either directly or indirectly with a rotor assembly of a generator housed inside the nacelle. A plurality of wind turbine generators may be arranged together to form a wind park or wind power plant.

Wind power plants are coupled to an electrical network or a power grid. In some situations, wind power plants are situated in rural areas, and infrastructure is sometimes inadequately set up to support the wind power plant electrical distribution. As a result, such electrical grids which are far from the main generation units are characterized by low fault level at the point of connection, also known as a "weak grid". A wind power plant connection to a weak grid faces challenges in both steady state and transient conditions.

A weak transmission grid or electrical grid or power grid or network grid is characterized by high grid impedance due to the low fault level. In a weak grid, it is typically necessary to take voltage level and fluctuations into account because there is a probability that the values might exceed the requirements in the standards when load and power production cases are considered. Where a wind energy plant or a wind power plant is in a weak grid environment, or connected or coupled to a weak grid, due to the higher impedance of the grid, the amount of wind energy that can be pushed into the grid at the point of connection is limited because of a relatively large fluctuation of the voltage and due to stability of the grid system. Further, during normal operation, voltages in a weak grid can exceed or go below the normal continuous operating voltage range of the grid.

This can lead to situations, in which voltage fluctuations can result in unstable steady state operation, for example, leading to a re-triggering loop due to voltage instability at the grid side. In addition, the weak grid brings about increased reactive power losses, which can require extra dynamic compensation, this leads to less reactive power being available to boost the grid voltage, leading to larger voltage fluctuations, and resulting in unacceptable voltage oscillations in the grid.

During transient conditions such as system faults, the wind turbines connected to a weak grid face challenges such as troubled recovery from the fault, large oscillations in active power and voltage, and often face unwanted trips due to overvoltage protection settings at the wind turbine or wind power plant level.

There is as such a desire for a method for operating a wind power plant in a weak grid environment which can continue to be connected to and supporting the grid during small voltage disturbances and fault events.

SUMMARY

According to various embodiments, there is provided a method for operating a wind power plant in a weak grid environment, the wind power plant being coupled to an electrical grid, and including a power plant controller for controlling a plurality of wind turbine generators of the wind power plant, the method including: determining whether the electrical grid fulfils a weak grid criterion; when the weak grid criterion is fulfilled, setting the power plant controller to operate in a weak grid mode when the weak grid criterion is fulfilled, the weak grid mode including: when a grid voltage deviates from a normal operating voltage range beyond a threshold voltage, reducing and providing an active power reference according to which the plurality of wind turbine generators are controlled; and when the electrical grid recovers from the voltage deviation, controlling each wind turbine generator of the plurality of wind turbine generators to generate a reduced amount of active power based on the provided active power reference.

According to various embodiments, there is provided a wind power plant coupled to an electrical grid and including a plurality of wind turbine generators. The wind power plant can include a power plant controller including a weak grid determination module configured to determine whether the electrical grid fulfils a weak grid criterion; an operation state controller configured to set the power plant controller to operate in a weak grid mode when the weak grid criterion is fulfilled; a power reference modification module configured to reduce and provide an active power reference according to which the plurality of wind turbine generators are controlled, when a grid voltage deviates beyond a threshold voltage from a normal operating voltage. The plurality of wind turbine generators can each include a wind turbine power controller configured to generate a reduced amount of active power based on the provided active power reference, when the electrical grid recovers from the voltage deviation.

BRIEF DESCRIPTION OF THE DRAWINGS

In the drawings, like reference characters generally refer to the same parts throughout the different views. The drawings are not necessarily to scale, with emphasis instead generally being placed upon illustrating the principles of the present disclosure. It is to be noted that the accompanying drawings illustrate only examples of embodiments of this disclosure and are therefore not to be considered limiting of its scope, for the disclosure may admit to other equally effective embodiments. In the following description, various embodiments of the disclosure are described with reference to the following drawings, in which.

DETAILED DESCRIPTION

Figure 1:
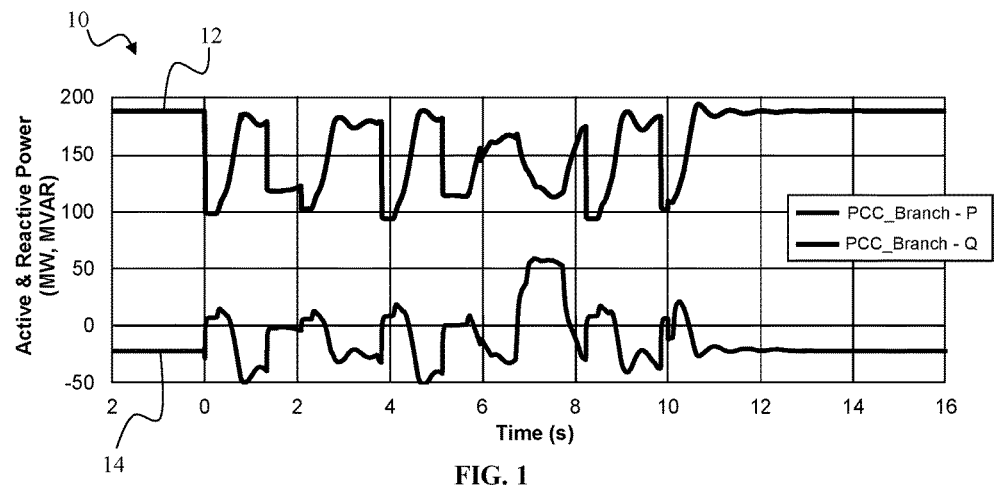
FIG. 1 illustrates a chart showing variation of active power and reactive power during a voltage dip in a steady state according to an example.

Embodiments of a method for operating a wind power plant and a wind power plant are described in detail below with reference to the accompanying figures. However, it should be understood that the disclosure is not limited to specific described embodiments. It will be appreciated that the embodiments described below can be modified in various aspects, features, and elements, without changing the essence of the disclosure. Further, any reference to various embodiments shall not be construed as a generalization of any inventive subject matter disclosed herein and shall not be considered to be an element or limitation of the appended claims except where explicitly recited in a claim(s).

According to various embodiments, depiction of a given element or consideration or use of a particular element number in a particular FIG. or a reference thereto in corresponding descriptive material can encompass the same, an equivalent, or an analogous element or element number identified in another FIG. or descriptive material associated therewith. The use of "/" herein means "and/or" unless specifically indicated otherwise.

The present disclosure can describe embodiments of a consumer electronic device which can be operable in various orientations, and it thus should be understood that any of the terms "top", "bottom", "base", "down", "sideways", "downwards" etc., when used in the following description are used for convenience and to aid understanding of relative positions or directions, and not intended to limit the orientation of the recording medium or a system or apparatus or product incorporating the recording medium.

A computing system or a controller or a microcontroller or any other system providing a processing capability can be presented according to various embodiments in the present disclosure. Such a system can be taken to include a processor. A system or apparatus according to various embodiments can include a controller which may include a memory which is for example used in the processing carried out by the wind power plant controller and/or the wind turbine controller. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In various embodiments, a "circuit" may be understood as any kind of a logic implementing entity, which may be special purpose circuitry or a processor executing software stored in a memory, firmware, or any combination thereof.

Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with various alternative embodiments. Similarly, a "module" is thusly defined as a portion of a system according to various embodiments in the present disclosure and may encompass a "circuit" as above, or may be understood to be any kind of a logic-implementing entity therefrom. Further, a module can be called, or may be in the form of, a unit, means, device or equipment.

Prior to discussion as to embodiments of the present disclosure, several points of general information are set out in providing a clearer understanding of the embodiments of the disclosure.

In general, electrical grids are typically governed by grid codes which regulate all power generating devices coupled to the grid for normalized operation. Wind power plants which are coupled on to a power grid fall under such regulation and are required to perform accordingly to a number of scenarios, one of which is that of staying connected to the grid during a fault event, for example, a low voltage fault event, and to contribute to the recovery of the power grid.

In a low voltage fault or a voltage dip event, the wind power plant is required to provide a reactive current contribution to support the grid voltage, as according to various grid codes. In certain grid codes, a generating plant connected to the electrical grid must maintain reactive current voltage support even after the grid voltage has returned to the normal continuous operating voltage band. For some grid code regulations, the normal continuous operating voltage band is from 0.9 pu to 1.1 pu.

In voltage dip occurrences in weak grids, and in an instance where a wind power plant is connected to the electrical grid, the wind power plant is expected to similarly provide a reactive current support in assistance to grid voltage recovery. Typically, a predetermined reactive current injection curve is provided for the provision of reactive current by a wind turbine generator or a wind power plant during the voltage dip. In situations where a recovery of a grid voltage is successful, the grid voltage of the electrical grid returns back to a reference voltage band of normal operation. However, according to various grid codes, reactive current support to the electrical grid is to continue even after the grid voltage recovers. It is in such a recovery situation, where for a weak grid, additional reactive current support can cause the wind turbine generator to trip due to exceeding a high voltage limit and if reached to the full active power generation enter a re-triggering loop due to voltage drop at the grid side.

FIG. 1 illustrates a chart 10 showing variation of active power and reactive power during a voltage dip in a steady state according to an example. In a representative example, a wind power plant rated at 190 MW and coupled to a weak grid experiences a grid voltage dip and operates accordingly. Curve 12 relates to the amount of active power generated by the wind power plant and measured at the point of common coupling (PCC). Curve 14 corresponds to curve 12 and relates to the amount of reactive power generated by the wind power plant and measured at the PCC. Steady state operation is charted by curves 12 and 14.

It can be observed from time frame −2 seconds to 0 seconds, that the active power generated prior to the voltage dip occurrence is about 190 MW, which is substantially equivalent to the maximum power output for the wind power plant. At 0 seconds, the grid voltage dips to a value of 0.885 p.u. As can be observed from curve 12 and curve 14, in response to the voltage dip, as part of a low voltage ride through response, the active power of the wind power plant drops to about 100 MW, and the reactive power increases to by about 40 MVAR. The increase in reactive power output is able to boost the grid voltage to the point where the wind turbine generators in the wind power plant can resume normal operation. However, when the wind turbines return to normal operation and produce their normal rated power output, the reactive power availability correspondingly drops. This leads to where the increased grid or network voltage cannot be sustained.

There can be various factors or reasons that contribute to such a reactive power drop. For example, as the active power increases in the wind turbine generators, the reactive power capability reduces from about 1 MVAR to about 0.406 MVAR per wind turbine generator. An issue can also be where the poor voltage regulation in the grid and collector network at higher or peak power production. Even small voltage fluctuations in the grid, in the range of +/−10% can result in unstable steady state operation. As a result of the fluctuation in grid voltage, the wind power plant, and the wind turbine generators cyclically enter a low voltage ride through mode where the voltage rises, and back to a normal mode, where the voltage cannot be sustained, and thereby drops again.

Figure 2:
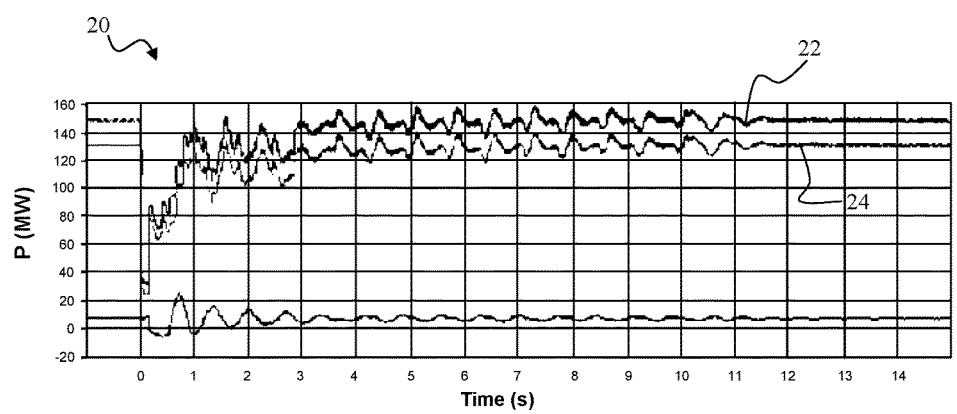
FIG. 2 illustrates a chart showing variation of active power and reactive power during a voltage dip in a transient state according to an example.

FIG. 2 illustrates a chart 20 showing variation of active power and reactive power during a voltage dip in a transient state according to an example. In a representative example, a simulation is carried out for which a wind power plant rated at 150 MW and coupled to a weak grid experiences a grid voltage dip and operates accordingly. Transient operation is shown, identifying the response prior to steady state operation.

Curve 22 relates to the amount of active power generated by the wind power plant and measured at the point of common coupling (PCC). Curve 24 relates to active power measured at another bus in the power system. In this case, curve 24 relates to active power measured at the plant distribution bus. It can be observed that upon the occurrence of the voltage dip, the wind power plant output, as shown by curve 22, drops to about 20 MW. After the fault is cleared, which can be defined by the grid voltage being restored to normal operating value, within the continuous operating voltage band, the wind turbines seek to recover active power as soon as possible. It is observed that the active power is back to pre-fault value within 2 seconds. However, this results in oscillations in active power and voltage, which leads to retriggering occurring several times within the next few seconds. It is observed that the system thereafter requires up to 12 seconds to stabilize itself.

Several issues there by arise, in relation to operation during transient conditions. There can be an overvoltage trip of wind turbine generators after the fault clearance. This is due to the higher reactive power supplied by the wind turbines during a fault. After the fault, the wind turbines are not able to reduce the reactive power immediately, and if the grid is considered too weak to absorb the reactive power injected, a higher voltage will result at the wind turbine terminals. This can cause overvoltage protection to trip the wind turbines.

Further, during fault recovery, as the active power increases, so do the reactive losses in the network, in proportion to the square of current, e.g. $Q_{loss}=3I^2X$. As a result, less reactive power is available to boost the network voltage from the grid and larger voltage fluctuations are observed, which can result in unacceptable voltage oscillations in the grid.

In another example, after a fault in the electrical grid is cleared, the wind turbines come out of the low voltage mode and try to adhere to the pre-fault power references, which can result in voltage and active power oscillations. The voltage oscillations can be more than 15% and result into AGO re-triggering and unacceptable active power and voltage fluctuation.

Figure 3:
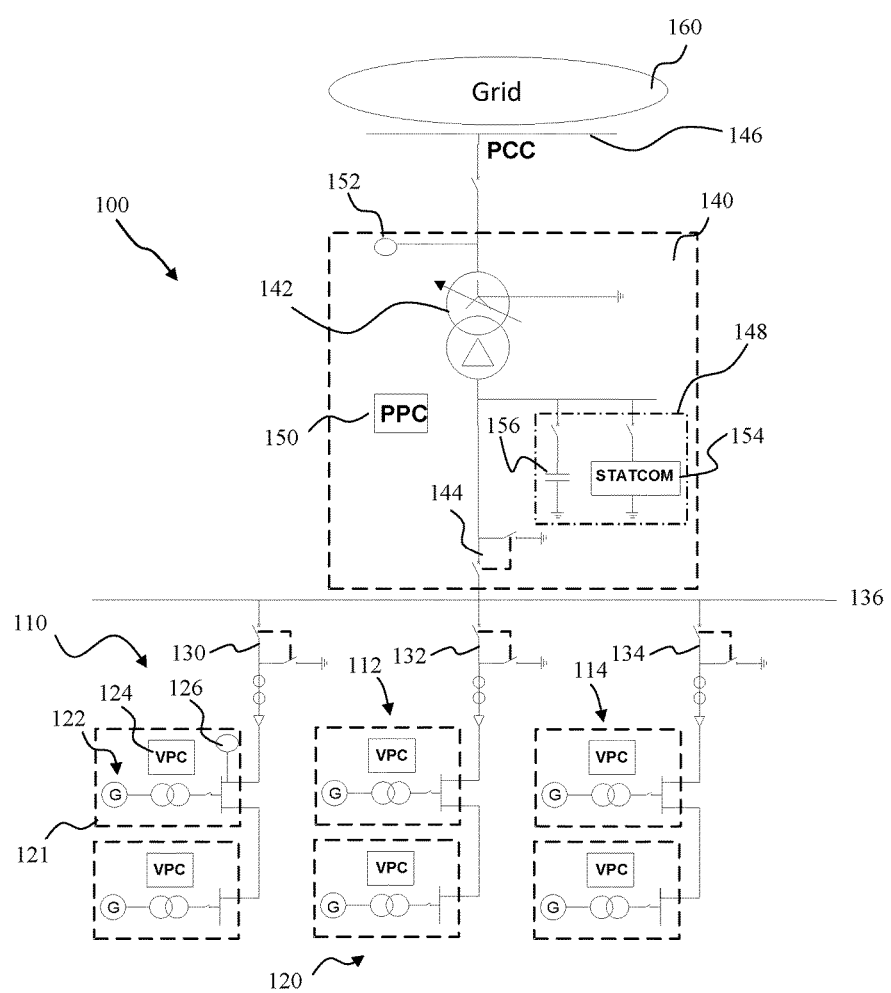
FIG. 3 illustrates a wind power plant according to an embodiment.

FIG. 3 illustrates a wind power plant according to an embodiment. In an embodiment, wind turbine plant or a wind power plant 100, is provided. A wind power plant is typically formed as a collection of wind generation units, or wind turbine generators, such that control is centralized and a single coupling is made to an electrical grid, or an electrical transmission grid, or an electrical distribution grid, or a power grid 160.

In an embodiment, wind power plant 100 includes a plurality of transmission branches 110, 112, 114, each including a plurality of wind turbine generators, or wind turbines, 120 electrically connected to a corresponding transmission branch. In an embodiment, the wind power plant 100 includes a fleet of similar wind turbine generators 120. In embodiments, it is possible to have a variety of wind turbine generators connected to the transmission branches in the wind power plant. This is as wind turbine generators are typically geographically distributed at various locations where prevailing winds would be better utilized by different types of wind turbine generators. In an embodiment, there are two wind turbines connected to transmission branches 110, 112, 114. However, there are typically no guidelines as to the number of wind turbines per transmission branch, simply by preference of physical location.

Each transmission branch 110, 112, 114 is coupled to a plant distribution bus bar 136, which may also be known as a main bus bar, by a transmission branch circuit breaker 130, 132, 134. The function of the transmission branch circuit breaker is to protect both the wind turbines connected to the transmission branch and the other portions of the wind power plant from power surges or spikes which might take place when there is a fault in the electrical grid or in the plant. In such an instance, the circuit breaker 130 trips into an open circuit condition, and isolates the transmission branch 110 from the wind power plant 100, until the fault is identified and addressed, and the electrical system is back in order for the reconnection of the transmission branch 110.

The wind power plant 100 can include a plant substation 140, which can be coupled to the plant distribution bus bar 136. Plant substations can either be a physical area of the wind power plant or an aggregated number of features spread over the plant. In an embodiment, the substation 140 is presented as being located in one physical area. According to the embodiment, the main components of the substation 140 are the main transformer 142, which steps up generated power in the plant to an appropriate voltage to be provided to an electrical grid 160, and the main switchgear 144, which defines an active switch for the wind power plant. The plant substation 140 sits in between the transmission branches 130, 132, 134 of the wind power plant 100 and the point of common coupling 146 to the electrical grid 160.

According to an embodiment, some power compensation equipment 148 is located together with the plant substation 140. In an embodiment, the power compensation equipment 148 includes a number of static synchronous compensators (STATCOMs) 154. Further, the plant compensation equipment 148 can also include switched capacitor banks 156. In embodiments, other alternatives are also possible, such as: switched inductor banks, static condensers, and synchronous condensers. The power compensation equipment 148 is used to control the power factor, the level of reactive power contributed, or the voltage level of the point of common coupling 146. In various embodiments, the power compensation equipment could be distributed to and located at each wind turbine generator 120.

Operation of the wind power plant 100 is controlled by a plant power controller ("PPC") 150 that dispatches various reference set points to individual wind turbine generators 120 in the wind power plant 100. The plant power controller 150 also receives multiple sources of measurements or output readings from each wind turbine generator 120, as well as from various locations on the transmission branches 110, 112, 114, the distribution line 136, the plant substation 140, and the electrical grid 160, and uses the information received to optimize the wind power plant fault current contribution to the electrical grid. The plant power controller 150 can also receive set points for operation from the grid operator of the electrical grid 160 the wind power plant 100 is coupled to.

According to an embodiment, the PPC 150 of the wind power plant 100 is part of a supervisory control and data acquisition (SCADA) network coupling the plant 100 and the plurality of wind turbine generators 120 in the plant 100 to a remote data and control center. The plant SCADA network can include data transmission coupling between plant and turbine controllers provided by a laid fiber optic transmission. A SCADA control module (not shown) can be included, configured to provide control and oversight of the SCADA network. The SCADA control module can include sub-systems to consolidate measurement data received from the components of the plant, to communicate messages, and various other operational functions. In embodiments, the SCADA control module and the PPC 150 can be physically located in the plant substation. In embodiments, the SCADA control module and the PPC 150 can be located in an annexure of the wind power plant 100. It is understood that physical location poses no limitation to the operation of the wind power plant 100.

In an embodiment, a sensor 152 is provided at the point of common coupling 146, and the resultant output is provided to the PPC 150 for monitoring of electrical characteristics of the electrical grid 160. A voltage and current characteristic can be monitored, and post-processed to various useful characteristic formats by the PPC 150.

According to various embodiments, the plurality of wind turbine generators can include one or more types or versions of wind turbine generators. A wind turbine generator 121 is schematically represented and can representatively exemplify a wind turbine generator of the plurality of wind turbine generators. Wind turbine generator 121 can include a plurality of rotor blades driving a rotating main shaft which is mechanically coupled to a gearbox which steps up the rotation for a high-speed generator shaft of a power production system 122. In an embodiment, the power production system 122 includes a doubly fed induction generator (DFIG in which the generator shaft is coupled to the generator rotor or Type3). In an embodiment, the generator is a Full Converter Generator (Type4) generator. The Type4 generator is coupled to a full scale power converter. The method as described in embodiments of the present disclosure is applicable to both Type3 and Type4 machine. In the doubly fed induction generator, mechanical torque is converted into electrical power, which is thereafter provided to a frequency converter for power conditioning. The output of the frequency converter is stepped up with a transformer provided in the turbine, which subsequently produces electrical power rated at 30 kV (it can be any voltage rating from 10 kV to 35 kV) to the transmission branch 110. In various embodiments, the transformer can step the electrical power up to a voltage rating of from 10 kV to 35 kV.

In other embodiments, the turbines in the plant can include a power production system including a generator which can be a singly-fed synchronous generator, an induction generator, a permanent magnet generator or any other type of generator including a stator winding. Further, turbines in other embodiments can include a power production system including direct drive or other alternative drive systems, which eliminate the use of a traditional gearbox. Any wind turbine power production system electrical configuration can be possible in satisfying the purpose of electrical power generation from kinetic wind capture.

According to an embodiment, in normal operation, wind turbine generator 121 receives a power reference from the PPC 150 such that a controlled output of electrical power is generated. The power references generated by the PPC 150 depend on the grid operating condition as experienced by the grid operator, as well as the presently experienced wind for energy conversion. In an embodiment, the power reference from the PPC 150 can be provided as an active power reference P* and a reactive power reference Q*, indicating to the wind turbine generator 121 as the required amount of power to be generated and supplied by the wind turbine generator 121 as part of the wind power plant's contribution to the electrical grid 160. In an embodiment, the power reference from the PPC 150 can also be a power factor reference, which can be defined as the ratio of the real power to the load, to the apparent power in the circuit, i.e. the ratio of active power to the reactive power.

In an embodiment, wind turbine generator 121 includes a wind turbine controller (not shown). The wind turbine controller includes control capabilities for controlling various aspects of wind turbine functionality, for example, wind capture optimization in nacelle yaw and blade pitch capabilities, emergency procedures such as emergency brake or turbine shutdown, or electrical production control. In various embodiments, the wind turbine controller is configured to maximize power production, whilst preventing damage to the wind turbine or to the load.

In an embodiment, the wind turbine controller can include a wind turbine power controller 124. The wind turbine power controller 124 can be provided with processing power, such as with computers, microprocessors, microcontrollers, digital signal processing (DSP) boards, Application Specific Integrated Circuits (ASICs) or any others, and with accompanying appropriate memory modules or any non-transitory computer-readable storage medium.

The wind turbine power controller 124 is provided for the supervision of the power production capability of the wind turbine generator 121. In various embodiments, the wind turbine power controller 124 is coupled to the PPC 150 and receives from the PPC an active power reference P* and a reactive power reference Q* for a provision requirement of the wind turbine generator 121 to the plant 100. Further, the wind turbine power controller 124 is coupled to and is constant communication with the wind turbine controller. In various embodiments, information regarding the control of the wind turbine generator 121 is provided to the wind turbine controller for executing, and sensor information is provided to the wind turbine power controller 124 for use in optimizing power generation by the wind turbine generator 120. Under normal operating conditions the turbine will follow the P* and Q* reference from the PPC.

In an embodiment, the wind turbine power controller 124 is coupled to a voltage sensor 126 configured to take an electrical voltage measurement at the point of coupling of the wind turbine generator 121 to the wind power plant 100. In an embodiment, the voltage sensor is configured to take an electrical voltage measurement at the point of coupling of the wind turbine generator 121 to transmission line 110 as part of the wind power plant 100. The wind turbine power controller 124 receives an output of the voltage sensor 126, which reflects a voltage of the transmission line 110 of the wind power plant 100, which is also a representation of the grid voltage of the electrical grid 160 as coupled with the wind power plant 100.

Each of the wind turbine generators 120 in the wind power plant 100 similarly includes a voltage sensor input, the voltage sensor configured to take an electrical voltage measurement at the point of coupling of each of the plurality of wind turbine generators 120 to a transmission line of the wind power plant. Each voltage sensor would provide an individual reading to a wind turbine power controller provided in each of the plurality of wind turbine generators 120 in the wind power plant. Although a reflection of the grid voltage as coupled to the electrical grid 160, which can be taken from sensor 152, each voltage sensor 126 would provide a slightly different reading in view of the different physical electrical characteristics, such as impedance, capacitance and inductance of each measuring location to the point of common coupling 146.

In an embodiment, a voltage sensor is provided on each of the transmission lines 110, 112, 114 of the wind power plant. Such a voltage sensor registers and monitors electrical voltage characteristics of the wind power plant at each transmission line and provides an output reading to each of the wind turbine generators coupled to the transmission line. Such an arrangement might be suitable for when the transmission line includes wind turbine generators relatively close to one another, thereby allowing for a minimal lag time in data transmission, as well as only slight deviation in physical electrical transmission variation.

According to various embodiments, grid measurement readings can be taken by sensor 152, which can be an array of various sensors. In power system analysis, it is known to classify the strength of an electrical grid 160 on the basis of a "short circuit ratio" (SCR). Such a determination can be given by:

$$SCR \approx \Delta Q/\Delta V \quad (1)$$

where $\Delta Q$ is the change in reactive power and $\Delta V$ is the change in grid voltage.

From Equation (1), it can be observed that the lower the value of SCR, the higher will be a voltage fluctuation in the electrical grid for a given reactive power exchange at the point of common coupling. If the SCR is less than 3, the grid can be considered to be a "weak grid".

SCR can also be defined as follows:

$$SCR \cong \frac{\text{Min Fault } (MVA) \text{ at } PCC}{\text{Total MW connected}} \quad (2)$$

Further, weak grids typically have a low reactance-to-resistance ("X/R") ratio, which indicates a relatively higher ohmic character for the grid. Such a low X/R ratio can indicate that active power flow has a relatively high impact on the resultant grid voltage.

From Equations (1) and (2), it can be observed that in a weak grid, there is a coupling or relationship between active power and grid voltage. As such, with a fluctuation in voltage, a corresponding fluctuation can be observed in power output, and vice versa. Hence, in a weak grid environment, a voltage fluctuation can occur with both active and reactive power exchange at the point of common coupling 146.

According to various embodiments, a method of operating a wind power plant is provided. In such a method, a new operational mode is introduced. In embodiments, a "weak grid mode" is introduced to the method of operating a wind power plant 100, which can be run or carried out by the PPC 150. In embodiments, the PPC 150 can calculate the SCR, based on Equation (1), with respect to the plant distribution bus bar 136 or at the point of common coupling 146 of the wind power plant. Generally, the SCR is determined from measurements taken at the bus bar 136. The SCR can be constantly recalculated, to provide an updated indication of the strength of the electrical grid 160. In embodiments, the SCR calculation is refreshed every 10 seconds. In embodiments, the wind power plant 100 enters a weak grid mode when the SCR is less than 3. Accordingly, a weak grid state can be set to 1, when the SCR of the grid is determined to be less than 3. The PPC 150 can change a weak grid state indication based on the SCR of the grid.

In a weak grid mode, and where the wind power plant 100 is operating in steady state condition, if the electrical grid experiences a voltage excursion or fluctuation beyond a normal operation range, a revision to the power reference P* is sent out. A reference grid voltage or a normal defined operation range can be 1.0 p.u.±10% (or 0.9-1.1 p.u.). In embodiments, the defined operation range can be refined and arrived at after an electrical site study of the wind power plant. Such an electrical site study can be a detailed engineering analysis or a power system modeling and operational simulation of the wind power plant. As indicated, the PPC 150 determines the amount of power to be generated by the wind power plant and provides an active power reference P* to the wind turbine generators. In a weak grid mode, the active power reference P* can be modified to a lower value $P_{min}$, to reduce fault-ride through (FRT) retriggering occurrence, and for stability considerations. In embodiments, the $P_{min}$ can be determined through engineering analysis studies. In an embodiment, the $P_{min}$ is determined to be 0.5 p.u.

Figure 4:
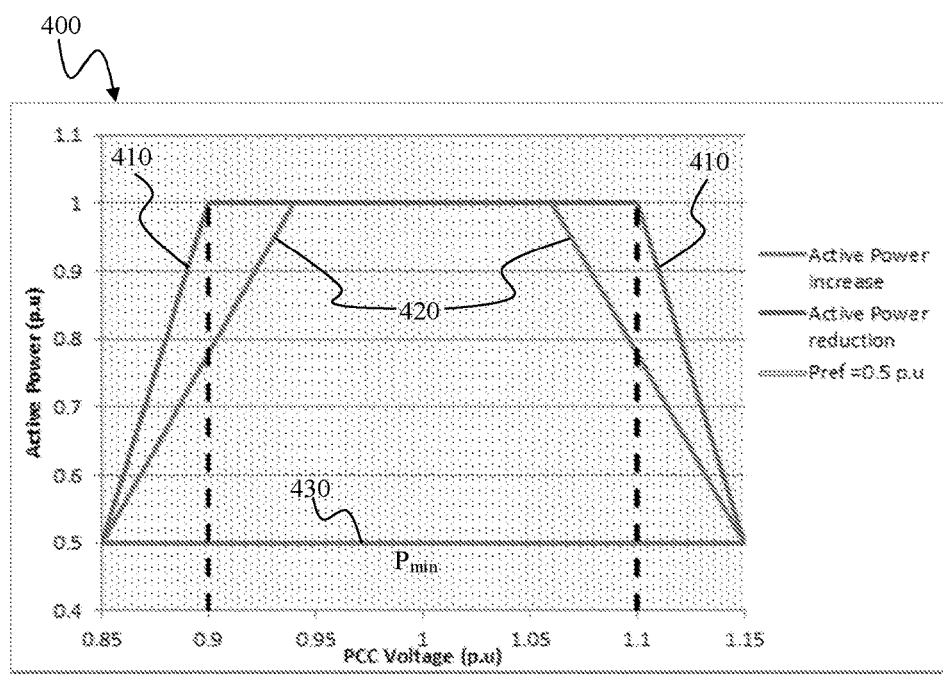
FIG. 4 illustrates an active power chart according to an embodiment.

FIG. 4 illustrates an active power chart according to an embodiment. Chart 400 can indicate the amount of active power for which the wind power plant is to provide, according to an embodiment. In a weak grid mode, when the grid voltage drops below 0.9 p.u., the active power is curtailed to the amount as indicated by a power reference $P_{min}$, as shown by curve 430. $P_{min}$ can be observed to be 0.5 p.u. In other embodiments, $P_{min}$ is determined through an engineering analysis. The corresponding is true, in curtailing the active power, when the grid voltage exceeds 1.1. p.u. When the grid voltage recovers, the active power of the wind power plant can correspondingly recover. Curve 420 indicates the return to peak production in response to grid voltage recovery. The ramp-down rate of 410 and the ramp-up rate of 420 can be different. In embodiments, the ramp-down rate is quicker than the ramp-up rate. In other embodiments, the ramp-down rate and the ramp-up rate can be the same. The slope is preferably site specific, and calculated through a detailed engineering analysis of the wind power plant installation.

In embodiments, when the wind power plant 100 enters a weak grid mode, the PPC 150 modifies the P* to $P_{min}$ and sends the modified active power reference to each wind turbine generator 120. As such, when the grid voltage deviates outside of the normal operation range, the active power is curtailed to the $P_{min}$ level. Further, should the wind turbines enter a FRT mode, the active power to be generated and delivered will be based on the provided $P_{min}$.

In embodiments, the PPC 150 can enter a FRT mode when the grid voltage deviates out of a normal operation range and below a threshold value. The normal operation range for which to modify the P* to $P_{min}$ can be the same operation range for which the wind power plant and the wind turbines enter a FRT mode. In embodiments, the operation ranges can differ, for example, the P* can be modified to $P_{min}$ when the voltage deviates from a range of 1.0 p.u.±10%, while FRT mode can be entered when the voltage deviates from a range of 1.0 p.u.±15%. It is noted that when the PPC 150 enters into a FRT mode, all controls and variables are typically frozen. It is also noted that before such freezing, the P* will have been modified to $P_{min}$ for delivery to the wind turbines 120.

Figure 5:
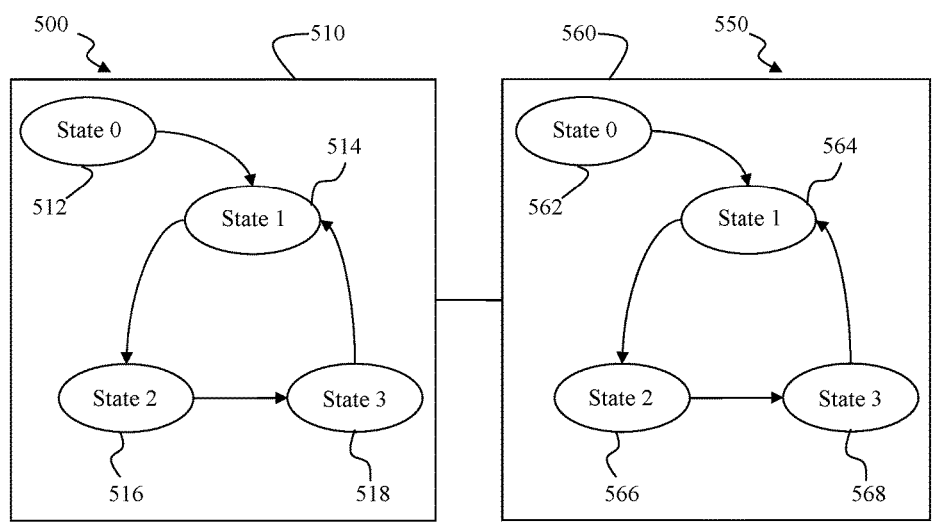
FIG. 5 illustrates a pair of state models according to an embodiment.

FIG. 5 illustrates a pair of state models according to an embodiment. According to an embodiment, the PPC 150 can include a state module or a state controller or a state machine 500. According to embodiments, the state machine 500 can be provided for the operation of various power generation capabilities within the wind power plant 100. In an embodiment, the state machine 500 can be provided for controlling a wind power plant operational state, which can determine the operational state of the wind turbine generators 120 in the wind power plant.

In an embodiment, the wind turbine power controller 124 can include a state machine 550 which can reflect the state machine 500 of the PPC 150. A similar state model 560 can be provided in the state machine at the PPC 150 and the state machines at individual wind turbine generators for streamlined operation. As indicated above, the wind turbine power controller of each wind turbine generator is coupled to the PPC 150 with a fiber optic data transmission connection, which can provide for an effectively instantaneous updating of the wind turbine state machine, when a change in state is carried out in the state machine 500 of the PPC 150.

In an embodiment, the state machine 500 provides a state model 510 relating to a fault handling process in a weak grid mode. In an embodiment, the state model 510 is provided for handling a low voltage grid event or a grid voltage dip event, where the grid voltage drops below a reference level to a low voltage fault level. In embodiments, the state model 510 is provided for a fault ride through mode of the wind power plant 100. Accordingly, a corresponding state model 560 can be provided for operation in a state machine 550 which can be hosted in a wind turbine power controller 124 at a wind turbine generator 120, where the state model 560 can be provided for a fault ride through mode of the wind turbine generator 120.

In an embodiment, the state model 510 includes a State 0 512, which relates to a state governing normal or typical operation for the wind power plant 100. Such a state can also correlate to a mode of operation, which can be considered a normal grid strength operating mode. In State 0 512, the wind power plant 100 receives set points from the grid operator, if any, and provides resultant power references to the wind turbine generators 120 installed as part of the wind power plant 100. State 0 512 typically can include a situation where functionality of the electrical grid 160 is provided at a regular reference state, for example, grid frequency and grid voltage of the electrical grid 160 is within a reference frame. In an embodiment, the electrical grid 160 can have a reference grid frequency of about 50 Hz±0.5 Hz, and a reference grid voltage of about 1.0 p.u.±10%. Grid characteristics falling within such a reference can be considered normal operation.

According to various embodiments, in normal operation under State 0 512, the wind power plant 100 generally seeks to provide its rated power to the electrical grid 160. Rated power can be understood to be the maximum power which can be delivered for the plant when an incident wind is in the ideal range at a wind turbine generator for energy conversion. Correspondingly, state model 560 for operation by state machine 550 in the wind turbine generator 120 can include a normal operation State 0 562.

In various embodiments, the PPC 150 determines whether the electrical grid fulfils a weak grid criterion. As mentioned above, a SCR calculation can be taken, for which a SCR value of less than 3 can indicate a weak grid environment. The PPC 150 can determine when the plant is in a weak grid environment, can change the operating state in the state model, from a normal operation state of State 0 512, to a weak grid state of State 1 514. Such a change in state is correspondingly provided to the wind turbine power controller 124, and in an embodiment, a state machine operating within the wind turbine power controller 124. Under a weak grid State 1 514, the PPC 150 can modify an active power reference P* to a reduced $P_{min}$, and deliver the reduced $P_{min}$ reference to the wind turbine generators 120. In embodiments, the modification of the active power reference to a reduced $P_{min}$ can take place based on a second threshold voltage which differs from a grid fault threshold voltage. In embodiments, the wind turbine generators 120 can operate and generate an active power based on the reduced $P_{min}$ when the grid voltage deviates beyond the second threshold voltage. In embodiments, wind turbine generators can generate based on the reduced $P_{min}$ when the grid voltage deviates from a normal operating grid voltage range of about 1.0 p.u.±10% (i.e. 0.9-1.1 p.u.). In embodiments, such a voltage range for normal operating grid voltage can be site specific and can be derived after a detailed power system analysis of the wind power plant.

In various embodiments, sensor 152 can detect a deviation in grid voltage from a normal defined operation range at the point of common coupling 146 to the electrical grid 160. Such a deviation can indicate a grid fault. In an embodiment, the deviation is a voltage dip below the reference threshold causing a low voltage grid fault. In detecting a grid fault, the PPC 150, or in an embodiment, the state machine 500 in the PPC 150, can change the operating state in the state model 510 from the weak grid operation state of State 1 514, to a weak grid fault ride through state of State 2 516, also known as a FRT mode. Such a change in state is correspondingly provided to the wind turbine power controller 124, and the state machine 550 operating within the wind turbine power controller 124 to change operation in the state model 560 to a weak grid fault ride through State 2 566. It is also noted that if the plant is not operating in the weak grid State 1 514, but in normal operation State 0 512, the fault ride through and fault recovery process follows normal order.

In an embodiment, the change in state from State 1 514 to State 2 516 takes place when the grid voltage dips below a reference voltage $V_{dip}$, i.e. where $V_{grid} < V_{dip}$. In an embodiment, the reference voltage $V_{dip}$ is set at the lower threshold of a reference grid voltage for normal operation, for example 0.9 p.u., when the reference grid voltage or normal defined operation range is 1.0 p.u.±10%. In another embodiment, reference voltage $V_{dip}$ is set at 0.85 p.u.

It is noted that in State 2 516, in view of the deviation in voltage, the active power generated by the wind power plant and the wind turbine generators is curtailed to a level based on the $P_{min}$ reference value. In embodiments, the $P_{min}$ reference relates to active power generation at 0.5 p.u. In other embodiments, the $P_{min}$ can be set to curtail active power generation to, for example, 40% of the P* value prior to the deviation in grid voltage. Such a curtailment occurs over and above typical fault ride through operational adjustment, for which a certain amount of reactive power is required, based on the grid voltage level, and for which an amount of active power generated is scaled back, to accommodate the reactive power generation. The amount of reactive power required is typically based on grid requirements. According to the present disclosure, the modified $P_{min}$ sets out a stricter amount of curtailment for the wind power plant, and in reducing the amount of active power generated and provided during the recovery of the grid voltage from a deviation, can provide for greater stability in a weak grid environment.

According to embodiments, prior to entering FRT mode, the PPC 150 carries out a modification of P* to $P_{min}$, and issues the modified active power reference to the wind turbine generators 120 in the wind power plant 100. Thereafter, in entering FRT mode, the PPC 150 typically freezes all controls and variables, and allow independent operation of the individual wind turbines 120 in carrying out the fault ride-through process.

In an embodiment, the wind turbine power controller 124 in a wind turbine controller receives a state change indication to State 2 566 from the PPC 150 and enters a FRT mode. In the FRT mode, wind turbine generators 120 in the wind power plant are expected to remain connected to the electrical grid, despite a drop in grid voltage. As voltage dips can be caused by too little power generation for an electrical consumption load in the electrical transmission grid, a disconnection of further power generators may cause a further reaction which can lead to the bringing down of the entire electrical transmission grid. Low voltage (or high voltage) ride through in wind turbine generators has been taught in various publications and for different variations of wind turbine generators and specifics will not be elaborated in this present disclosure.

As grid voltage recovers and rises from the low voltage dip, which had triggered the weak grid fault ride through State 2 516, in part with assistance from the reactive current injection from the wind power plant 100, the grid voltage passes a reference voltage predetermined as a reference condition for change of state according to the state model 510. According to an embodiment, a condition for wind power plant 100 operation in conjunction with an electrical grid voltage recovery from a voltage dip is provided as where the grid voltage exceeds a voltage dip reference. Such a condition can be provided as $V_{grid} > V_{dip}$. According to another embodiment, the condition can further include a timing factor, for example maintaining a recovery grid voltage for a certain period of time. In an embodiment, a condition for recovery can be provided as $V_{grid} > V_{dip}$, consistently maintained for a period of 50 ms. In various embodiments, the timing factor can be anywhere from 20 ms or 100 ms or more.

Upon satisfying such a predetermined condition, which indicates an initial recovery of the electrical grid voltage, the state machine 500 operating in the PPC 150 of the wind power plant 100 changes the operating state in the state model 510 from the weak grid fault ride through State 2 516 to a weak grid fault recovery State 3 518. The fault recovery state can also be known as a PQ regain mode. Such a change in state is correspondingly provided to the wind turbine power controller 124, and in an embodiment, a state machine 550 operating within the wind turbine power controller 124. The state machine arranged to change operation in the state model 560 to a weak grid fault recovery State 3 568.

In the weak grid fault recovery State 3 518, the wind power plant 100 is no longer required to provide a full output of reactive current. However, multiple grid codes still provide that connected generating plants should continue to provide recovery support for a further period of time. According to embodiments, the wind power plant 100 can operate in the weak grid fault recovery State 3 518 for about 10 seconds. In a typical fault ride through operation in a non-weak grid environment, it can be noted that such a fault recovery state usually lasts in the order of about 500 ms. In embodiments, the wind power plant 100 can operate in the weak grid fault recovery State 3 518 for up to about 600 seconds. The elongated period in the weak grid fault recover state is for allowing the grid voltage in the weak grid 160 to stabilize.

According to an embodiment, in weak grid fault recovery State 3 518, each wind turbine generator 120 can be operated independently to generate an electrical power. In such a case, wind turbine generator 121, as with the other wind turbine generators 120 in the wind power plant 100, receives an instruction from the PPC 150 to carry out a fault recovery process. Alternatively, wind power plant 100 can operate a plurality of wind turbine generators to independently generate an electrical power, and operate at least one other wind turbine generator based off a control determined at the PPC.

The instruction to carry out the fault recovery process is provided to the wind turbine power controller 124 of the wind turbine generator 121 when the state machine 500 carries out the change in state to the weak grid fault recovery State 3 518. In an embodiment, when the state machine operating within the wind turbine power controller 124 receives a change in state instruction from the state machine 500 in the PPC 150 to State 3 518, the wind turbine power controller 124 is configured to carry out a fault recovery process.

In a fault recovery process, the wind power plant 100 resumes the production of active power and delivers it to the electrical grid 160. In embodiments, under the weak grid fault recovery State 3 518, the wind power plant 100 produces a curtailed or limited amount of active power which is delivered to the electrical grid 160. According to embodiments, the wind turbine generators 120 generate an active power according to active power reference $P_{min}$ during the weak grid fault recovery State 3 518. Further, in embodiments, in the weak grid fault recovery State 3 518, the maximum active power the wind turbine generators 120 can provide can be user defined. In embodiments, the maximum active power the wind turbine generators 120 can produce in the weak grid fault recovery State 3 568 is limited to 40% of the P* before entering the fault ride through State 2 566. In embodiments, the maximum reactive power the wind turbine generators 120 can produce in the weak grid fault recovery State 3 568 is limited to 0.5 p.u.

In various embodiments, under the weak grid fault recovery State 3 518, the PPC 150 can operate the wind power plant 150 in a voltage control mode. In embodiments, under the weak grid fault recovery State 3 518, the wind turbine power controller 124 can operate the wind turbine generator 121 in a voltage control mode. With regard to reactive power generation, during normal operation (State 0 512) or in weak grid operation under normal grid voltage conditions (State 1 514), the reactive power reference Q* is generated by the PPC 150 based on grid requirements and provided to the wind turbine power controller 124 for generation and output from the wind turbine generator 121. During a grid fault and in the weak grid fault ride through state (State 2 516), the wind turbine generators 120 do not follow any reactive power control or reference. The wind turbine generators 120 simply produces and provides reactive power or reactive current based on the fault ride through profile and turbine voltage or grid-side voltage.

In the weak grid fault recovery State 3 518, the wind turbine power controller 124 can ignore the reactive power reference originally provided by the PPC 150-$Q^*_{(PPC)}$, which can be provided before the grid fault. Under voltage control, a reactive power reference $Q^*_{(VC)}$ can instead be generated by the wind turbine power controller 124 for generating reactive power for provision to the electrical grid.

In determining $Q^*_{(VC)}$, the voltage sensor 126 can obtain a voltage reading $V_{WTG}$, which is thereafter compared with a predetermined reference voltage $V_{ref}$, which can be set to a value in the earlier defined normal operating range, i.e. 0.9 p.u.≤$V_{ref}$≤1.1 p.u. The resultant voltage difference $V_{diff}=V_{ref}-V_{WTG}$, can be utilized in determining a current reference, where the current reference can be a reactive current reference $Q^*_{(VC)}$ which can indicate the desired amount of reactive current to be provided by the wind turbine generator 121 to the power grid 160.

The amount of reactive current, based on the reactive current reference $Q^*_{(VC)}$, to be provided by the wind turbine generator 121 to the power grid 160 is provided such as to provide a voltage control function for the wind turbine generator 121. In providing a certain amount of reactive current, the wind turbine generator 121 seeks to alter the grid voltage, such that a predetermined reference voltage or a target reference voltage $V_{ref}$ is achieved. In carrying out a voltage control method, instead of providing a fixed reactive current injection based on a predetermined curve, or a previously generated reactive current reference, the wind power plant 100 provides an injection which seeks to alter the grid voltage to a predetermined reference level, in a way functioning as a voltage controller for the electrical grid. According to various embodiments, in operating a voltage control method, the wind power plant 100 is arranged such that an amount of the total reactive power losses can be met by capacitor banks 156 in the substation 140. In embodiments, more than 60% of the reactive power losses can be met by the capacitor banks. In embodiments, operating a voltage control method can increase stability of the electrical system in reducing the occurrence of over-voltage tripping.

According to embodiments, the wind power plant 100 operates in State 3 518 for a period of time before returning back to State 1 514. In an embodiment, the state machine carries out a changing from the weak grid fault recovery state 518 to a weak grid state 514 upon the satisfaction of an exit condition. In an embodiment, an exit condition is a predetermined fault recovery state time period. In embodiments, the time period can be anywhere from 10 seconds to 600 seconds. In an embodiment, an exit condition is the maintaining of the grid voltage out of a threshold range for a predetermined fault recovery state time period. The time period can be restarted when the grid voltage continues to fluctuate and deviates out of the threshold range. This provides for a more certain fault recovery period in stabilizing the grid prior to providing full active power. In embodiments, the fault recovery exit conditions can be overridden by an electrical grid operator request. For example, the electrical grid operator can determine the electrical grid as stable and request for rated power generation and supply to the electrical grid.

In various embodiments, the PPC 150 can carry out a determination of whether the electrical grid fulfils a weak grid criterion, and it does not, the PPC 150 can change the operating state in the state model, from a weak grid state 514 to a normal operating state or in a normal grid strength operating mode of State 0 512. An SCR calculation can be made, and if the SCR value is greater than 3, the operating state is changed to a normal operating State 0 512. Such a change in state is correspondingly provided to the wind turbine power controller 124, and in an embodiment, the state machine 550 operating within the wind turbine power controller 124 is arranged to change operation in the state model 560 to a normal operation State 562. In various embodiments, after the predetermined fault recovery state time period expires, the PPC 150 can carry out an SCR calculation, and if the SCR value is greater than 3, the PPCT 150 can change the operating state from the weak grid fault recovery State 3 518 to the normal operating state 512.

Having changed state to State 0 512, the PPC 150 of wind power plant 100 generates and sends out power references P* and Q* to each of the coupled wind turbine generators 120 in the wind power plant 100, for generating a power for provision to the electrical grid 160. As can be noted, once the wind turbine generator 120 changes from operating in State 3, particularly operating a fault recovery process in State 3, the wind turbine power controller 124 ceases determining its own current reference and instead operates based on power references received from PPC 150. According to various embodiments, the active power generated by the wind power plant 100 is ramped up from a curtailed amount produced under $P_{min}$ in State 3 to a nominal active power production under P* in State 0, according to a ramp-up rate. In embodiments, the ramp-up rate is slower than the earlier defined ramp-down rate occurring under weak grid State 1. In embodiments, the ramp-up rate can be about 50 kW/second. In embodiments, the ramp-up rate can be predetermined through an engineering analysis of the wind turbine plant 100.

In various embodiments, the state machine 500 in the PPC 150 is in communication with the state machine 550 in the wind turbine power controller 124 in each of the plurality of wind turbine generators 120. In embodiments, the state machine 500 can communicate a change of operation state to the state machine 550. In embodiments, the state machine 500 can communicate with and force a change of operation state in the state machine 550 based on the operating state in the state machine 500. In embodiments, both the state machine 500 and the state machine 550 can undertake a change of operation states based on electrical characteristics obtained from grid sensors 152 and wind turbine voltage sensor 126 respectively. In embodiments, the state machine 550 can communicate with and force a change of operation state in the state machine 500 based on the operating state in the state machine 550.

In typical operation, when the PPC 150 or the wind turbine generators 120 enter a fault ride through mode, which can correspond to the weak grid fault ride through State 2 516, all parameters and communication are frozen, and response of the wind power plant or the wind turbine is based on an input of grid characteristic measurements. In embodiments, when the state machine 500 of the PPC 150 exits State 2 516 into State 3 518, the state machine 500 can communicate with the state machine 550 in each wind turbine generator to correspondingly exit the fault ride through State 2 566 into the fault recovery State 3 568.

Further, in typical operation, individual wind turbine generators 120 can enter a fault ride through mode based on the voltage characteristics as measured by the wind turbine voltage sensor 126, which is coupled to the respective transmission branch 110 to the plant distribution bus bar 136. It can then be noted that in view of the varying locations of the wind turbine generators 120 in the park, there can be correspondingly a varying of grid-side voltage measurements as obtained by the wind turbine voltage sensor 126. Such measurements can as well vary from the measurements as obtained by the grid sensor 152, which is notably closer to the grid coupling connection at the point of common coupling 146. This can lead to a situation where the state machine operation states differ between the PPC 150 and some of the plurality of wind turbine generators 120.

For example, some of the plurality of wind turbine generators can be in a weak grid fault recovery State 3 568, while the PPC still remains in weak grid fault ride through State 2 516, due to, for example, the grid sensor 152 not registering where $V_{grid} > V_{dip}$ is consistently maintained for a period of 50 ms. In embodiments, when a predetermined number of wind turbine generators have exited State 2 566 into State 3 568, while the PPC still remains in State 2 516, the state machine 500 can receive communication from state machines 550 from the plurality of wind turbine generators, and can force an operating state to State 3 518. In embodiments, the predetermined number of wind turbine generators can be set to 30% of the number of wind turbine generators 120 in the wind power plant 100. Other representative numbers can of course apply. In various embodiments, the converse can apply, where the PPC, in State 1 514, can be forced to enter State 2 516, based on a predetermined number of wind turbine generators having already entered State 2 566 from State 1 564, based on the local grid voltage measurement.

According to various embodiments, the operating state of the PPC 150 and all of the wind turbine generators 120 in the wind power plant 100 can be determined or controlled by the operation state in the state machine of a nominated wind turbine generator. Such a nominated wind turbine generator can be identified based on a grid voltage, being at a unique point as central in a weighted relative distribution of grid voltage measurements in the wind power plant. Such a wind turbine generator can be predetermined to represent a wind power plant fault ride-through state. In embodiments, the voltage sensor of the nominated wind turbine generator obtains grid characteristic measurements, and based on these measurements, the state machine in the wind turbine power controller sets the operating states in the state model accordingly. Any change in the state model is then taken as representation of the wind power plant, and communication is made with the PPC and all other wind turbine generators in the plant and the operation state changed accordingly. The nominated wind turbine generator can be determined from a detailed plant engineering analysis, and in some circumstances can be physically located in the middle of the plant collected network.

In various other embodiments, an additional sensor array can be coupled to the plant distribution bus bar 136. The electrical characteristic measurements from this sensor array can then be fed back to the PPC 150, which can change the plant operation state accordingly, for which the controllers in the plurality of wind turbine generators in the plant correspondingly follow. Such embodiments can take place so as to reduce the voltage difference that governs the fault ride through modes of the PPC or the wind turbine generators, or the weak grid fault ride through State 2 516 or 566.

In various embodiments, to facilitate a quick response in the operating state change between the PPC and various wind turbine generators in the plant, a fast communication network is provided, separate and in addition to the established SCADA network, which can include a fiber optic communication network between the PPC and the components and the generators in the wind power plant. In embodiments, a fast radio link network is provided between the PPC and the plurality of wind turbine generators. In embodiments, a microwave communication link is provided. Such a communication network can be provided with a transceiver provided at the PPC and at each of the wind turbine controllers, or power controllers. Such a communication network can be dedicated for operation state model communication, and separate from all other information relaying, to allow for optimum and efficient wind power plant control, especially during grid event scenarios, where time is of the essence.

Figure 6:
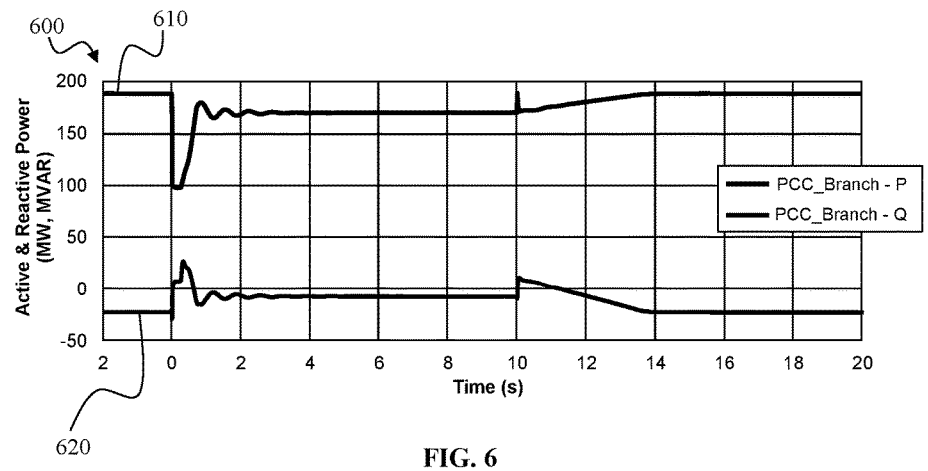
FIG. 6 illustrates a chart showing variation of active power and reactive power in response to a voltage dip in a steady state according to an embodiment.

FIG. 6 illustrates a chart 600 showing variation of active power and reactive power in response to a voltage dip in a steady state according to an embodiment. In a representative embodiment, a wind power plant rated at 190 MW and coupled to a weak grid experiences a grid voltage dip and operates according to a method of an embodiment. Curve 610 relates to an amount of active power generated by the wind power plant and measured at the point of common coupling. Curve 620 corresponds to curve 610 and relates to the amount of reactive power generated by the wind power plant and measured at the PCC. Steady state operation is charted by curves 610 and 620. It can be observed that there is no re-triggering of FRT mode operation, as compared with chart 10 of FIG. 1.

Corresponding to the state model of FIG. 5, at time 0 seconds, the electrical grid experiences a voltage dip, and the state machine 500 changes the operating state to weak grid fault ride through State 2 516. Wind power plant 100 thus carries out a FRT process in State 2 516. It can be observed that active power is dropped to allow the injection of reactive power. Accordingly, the grid voltage recovers, and the operating state is changed to a weak grid fault recovery State 3 518. The active power generated by the wind power plant ramps back up. However, it is noted that the active power reference is modified by the PPC 150 prior to the change to State 2 516, which thus causes the wind power plant to generate active power according to active power reference $P_{min}$ during the weak grid fault recovery State 3 518. It can be observed from curve 610 that the reduced active power generated is about 170 MW.

According to various embodiments, the reduced active power generation is maintained during the fault recovery State 3 518. In embodiments, the PPC 150 stays in the fault recovery State 3 518 for about 9 seconds. Thereafter, about 10 seconds after the grid voltage dipped, the PPC 150 exits the fault recovery State 3 518 to the weak grid State 1 512 or normal operating State 0 514, and ramps up to a nominal active power production. It can be observed that the ramp up in active power takes about 4 seconds. It can be observed that the amount of reactive power is inversely affected by the amount of active power generated.

Figure 7:
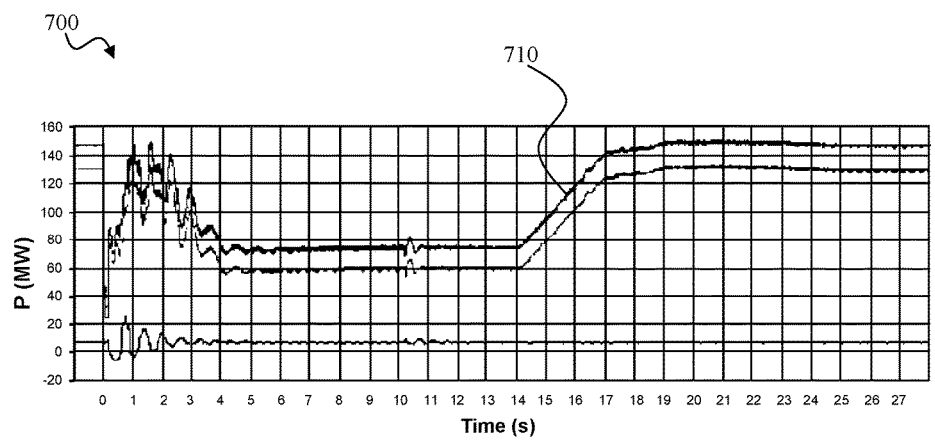
FIG. 7 illustrates a chart showing variation of active power and reactive power during a voltage dip in a transient state according to representative example.

FIG. 7 illustrates a chart 700 showing variation of active power and reactive power during a voltage dip in a transient state according to representative example. In a representative embodiment, a simulation is carried out for which a wind power plant rated at 150 MW and coupled to a weak grid experiences a grid voltage dip and operates accordingly. Transient operation is shown, identifying the response prior to steady state operation. The chart 700 highlights the effectiveness of operating at a curtailed active power output in a fault recovery mode after the correction of a grid voltage deviation.

Curve 710 relates to the amount of active power generated by the wind power plant and measured at the point of common coupling. In the present representative example, after the fault is cleared, the turbines try to follow the old P* for about 2 seconds. Thereafter, the PPC provides a modified active power reference $P_{min}$, the active power is curtailed to about 80 MW or 0.6 p.u., which leads to the grid voltage and turbine operation being stabilized. It can be observed that no further retriggering is observed in the wind power plant output. The active power is maintained at the curtailed level during the fault recovery mode for a few seconds and is thereafter ramped up to nominal value based on a predetermined ramp-up rate.

In an embodiment, the electrical grid experiences a high voltage surge fault or a grid swell. Similar to a low voltage event, the wind turbine generator is expected to stay connected to grid and not only ride out the high voltage event, but also to provide a compensatory reactive power in order to stabilize the grid. Such a process can be known as a high voltage ride through (HVRT). As the electrical grid can be a weak grid, a corresponding state model can be provided to achieve the same purpose of allowing a wind turbine generator to adaptively stay connected to a weak grid, while contributing to voltage stability. Various embodiments also include variations to support other kinds of electrical grid faults, such as symmetrical grid faults, asymmetrical grid faults, short circuit faults, etc.

Figure 8:
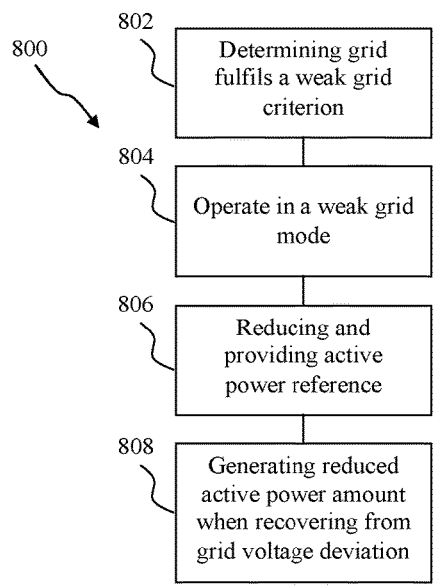
FIG. 8 illustrates a method for operating a wind power plant according to an embodiment.

FIG. 8 illustrates a method for operating a wind power plant according to an embodiment. According to an embodiment, method 800 can be a method for operating a wind power plant in a weak grid environment, the wind power plant being coupled to an electrical grid, and including a power plant controller for controlling a plurality of wind turbine generators of the wind power plant. In 802, the method can include determining whether the electrical grid fulfils a weak grid criterion. In 804, when the weak grid criterion is fulfilled, the method can include setting the power plant controller to operate in a weak grid mode. In 806, when a grid voltage deviates from a normal operating voltage beyond a threshold voltage, the method of operating the wind power plant in the weak grid mode can include reducing and providing an active power reference according to which the plurality of wind turbine generators are controlled. In 808, when the electrical grid recovers from the voltage deviation, the method can include controlling each wind turbine generator of the plurality of wind turbine generators to generate a reduced amount of active power with each of the plurality of wind turbine generators based on the provided active power reference.

In operating or controlling a wind power plant with such a method, the wind power plant is provided with a capability to comply with grid code requirements, with particular attention to weak grid situations. Such a method can provide a stabilizing effect on a weak grid undergoing a grid voltage event. Further, such a method can be carried out without need of expensive balance of plant compensation equipment. Typically, such functionality as advantageously provided by the method according to various embodiments can be implemented in existing wind power plants and wind turbine generators through a software upgrade, which is carried out without much complication as compared with additional hardware or equipment installation. Advantageously, such a method opens up additional markets to wind power plants, in seeking to service distance-challenged electrical grid interfaces.

In an embodiment, fulfilling the weak grid criterion can include determining a short-circuit ratio of the electrical grid; and determining that the short-circuit ratio is less than a predetermined value.

In an embodiment, the method can include maintaining the generation of the reduced amount of active power for a predetermined time period after the grid recovers from the voltage deviation.

In an embodiment, the method can further include ramping up the active power generated by the plurality of wind turbine generators after the predetermined time period, the ramping up of the active power being carried out at a predetermined ramp up rate.

In an embodiment, the method can include ramping up the active power to a maximum capability of each of the plurality of wind turbine generators.

In an embodiment, the method can include checking and satisfying that the grid voltage is within a range defined by the threshold voltage and the normal operating voltage for a predetermined time period prior to ramping up the active power generated.

In an embodiment, the method can include providing a varying amount of reactive power injection for the predetermined time period, the variation being based on a difference between a predetermined grid voltage reference level and a measured grid voltage amount.

In an embodiment, the method can include determining again whether the electrical grid fulfils the weak grid criterion after the ramping up of the active power, and when the weak grid criterion is not fulfilled, setting the power plant controller to operate in a normal grid strength operating mode.

In an embodiment, the method can include, when the grid voltage deviates beyond a second threshold voltage from a normal operating voltage, lowering the active power generated by each of the plurality of wind turbine generators to the reduced amount of active power.

In an embodiment, the method can include, when the grid voltage deviates beyond the threshold voltage from the normal operating voltage, controlling the power plant controller to provide the reduced active power reference to the plurality of wind turbine generators prior to entering a fault ride-through mode.

In an embodiment, the method can include controlling the power plant controller to provide an indication to the plurality of wind turbine generators to exit the fault ride-through mode.

In an embodiment, any one of the plurality of wind turbine generators is predetermined to represent a wind power plant fault ride-through state, and can provide an indication to the power plant controller to exit the fault ride-through mode In an embodiment, any one of the threshold voltage, the reduced power reference, the reduced amount of active power, the lowered amount of active power, the ramp up rate, and the active power reduction rate is determined by an electrical site study.

Figure 9:
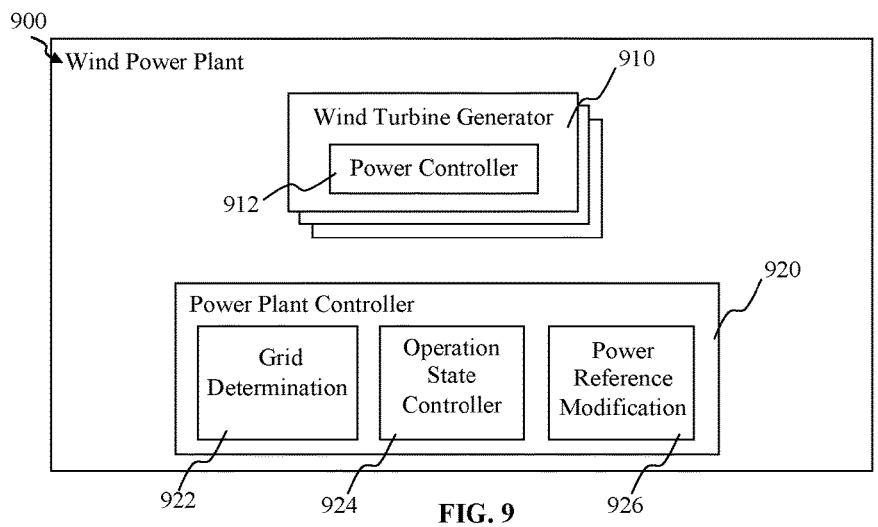
FIG. 9 illustrates a block diagram of a wind power plant according to an embodiment.

FIG. 9 illustrates a block diagram of a wind power plant 900 according to an embodiment. The wind power plant 900 is coupled to an electrical grid and can include a plurality of wind turbine generators 910. The wind power plant can include a power plant controller 920 configured to control the plurality of wind turbine generators. The plant controller 920 can include a weak grid determination module 922, configured to determine whether the electrical grid fulfils a weak grid criterion. The power plant controller 920 can further include an operation state controller 924 configured to set the power plant controller to operate in a weak grid mode when weak grid criterion is fulfilled. In an embodiment, the power plant controller 920 can include a power reference modification module 926, configured to reduce and provide an active power reference according to which the plurality of wind turbine generators are controlled, when a grid voltage deviates beyond a threshold voltage from a normal operating voltage. The plurality of wind turbine generators 910 can each include a wind turbine power controller 912, configured to generate a reduced amount of active power based on the provided active power reference, when the electrical grid recovers from the voltage deviation.

According to an embodiment, various features and components in the wind power plant can be implemented in one or more circuits and/or modules operating on either coupled or distinct processors.

In an embodiment, the weak grid determination module can be further configured to determine a short-circuit ratio in determining whether the electrical grid fulfils a weak grid criterion, and determine that the weak grid criterion is fulfilled where the short-circuit ratio falls below a predetermined value.

In an embodiment, the power plant controller can be configured to maintain the generation of the reduced amount of active power for a predetermined time period after the grid recovers from the voltage deviation.

In an embodiment, the power plant controller can be configured to ramp up the active power generated by the plurality of wind turbine generators after the predetermined time period, the ramping up of the active power carried out at a predetermined ramp up rate.

In an embodiment, the power plant controller can be configured to ramp up the active power to a maximum capability of each of the plurality of wind turbine generators.

In an embodiment, the power plant controller can be configured to check and satisfy that the grid voltage is within the range defined by the threshold voltage and the normal operating voltage for a predetermined time period prior to ramping up the active power generated.

In an embodiment, any one of the power plant controller or the wind turbine power controller can be configured to provide a varying amount of reactive power injection for the predetermined time period, the variation based on a difference between a predetermined grid voltage reference level and a measured grid voltage amount.

In an embodiment, the weak grid determination module can be configured to determine again whether the electrical grid fulfils the weak grid criterion after the ramping up of the active power, and the operation state controller can be configured to set the power plant controller to operate in a normal grid strength operating mode when the weak grid criterion is not fulfilled.

In an embodiment, the power plant controller can be configured to lower the active power generated by each of the plurality of wind turbine generators to the reduced amount of active power when the grid voltage deviates beyond a second threshold voltage from a normal operating voltage.

In an embodiment, the power plant controller can provide the reduced active power reference to the plurality of wind turbine generators prior to entering a fault ride-through mode when the grid voltage deviates beyond the threshold voltage from the normal operating voltage.

In an embodiment, the power plant controller can provide an indication to the plurality of wind turbine generators to exit the fault ride-through mode.

In an embodiment, the wind turbine power controller of any one of the plurality of wind turbine generators can provide an indication to the power plant controller to exit the fault ride-through mode.

In an embodiment, the threshold voltage, the reduced power reference, the reduced amount of active power, the lowered amount of active power, the ramp up rate, or the active power reduction rate can be determined by an electrical site study.

In an embodiment, the wind power plant can include a radio communication link between the power plant controller and at least one of the plurality of wind turbines, configured to carry an indication to exit a fault ride-through mode to or from the power plant controller.

According to various embodiments, there is provided a computer program product directly loadable into the internal memory of at least one digital computer provided in a wind power plant, including software code portions for performing the steps of a method according to an embodiment of the present disclosure when the computer program product is run on the at least one digital computer.

In various embodiments, a controller for carrying out an operational function in the wind power plant, which includes for example, but not limited to, a plant controller, a power plant controller, a SCADA controller, a compensation controller, a wind turbine controller, a wind turbine power controller, an active power controller, a reactive power controller, an operational state controller, or a state machine, can include or can be part of a digital computer configured to receive a computer program product. In embodiments, digital computers provided in the wind power plant are synchronized and operate cooperatively as part of an overall system.

The above apparatus, method and/or system as described and illustrated in the corresponding figures, is not intended to limit an or any apparatus, method or system as according to an embodiment, and the scope of the present disclosure. The description further includes, either explicitly or implicitly, various features and advantages of the method or system according to the present disclosure, which can be encompassed within an apparatus, method or system according to the disclosure.

While embodiments of the disclosure have been particularly shown and described with reference to specific embodiments, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A method for operating a wind power plant in a weak grid environment, the wind power plant coupled to an electrical grid and comprising a power plant controller for controlling a plurality of wind turbine generators of the wind power plant, the method comprising:
- providing, using the power plant controller, a first active power reference to the plurality of wind turbine generators;
- determining whether the electrical grid fulfills a weak grid criterion;
- when the weak grid criterion is fulfilled, setting the power plant controller to operate in a weak grid mode, wherein operating the power plant controller to operate in the weak grid mode comprises:
  - when a grid voltage deviates from a normal operating voltage beyond a threshold voltage and before the grid voltage begins to return to the normal operating voltage, providing a second active power reference to the plurality of wind turbine generators, wherein the second active power reference is less than the first active power reference; and
  - when the electrical grid recovers from the voltage deviation, controlling each wind turbine generator of the plurality of wind turbine generators to generate a reduced amount of active power based on the second active power reference.

2. The method of claim 1, wherein fulfilling the weak grid criterion comprises:
- determining a short-circuit ratio of the electrical grid; and
- determining that the short-circuit ratio is less than a predetermined value.

3. The method of claim 1, further comprising:
- maintaining the generation of the reduced amount of active power for a predetermined time period after the electrical grid recovers from the voltage deviation.

4. The method of claim 3, further comprising ramping up the active power generated by the plurality of wind turbine generators after the predetermined time period, the ramping up of the active power being carried out at a predetermined ramp up rate.

5. The method of claim 4, further comprising ramping up the active power to a maximum capability of each of the plurality of wind turbine generators.

6. The method of claim 4,
- wherein ramping up the active power generated is responsive to determining that the grid voltage is within a range defined by the threshold voltage and the normal operating voltage for a predetermined time period prior.

7. The method of claim 3, further comprising:
- providing a varying amount of reactive power injection for the predetermined time period, the varying amount being based on a difference between a predetermined grid voltage reference level and a measured grid voltage amount.

8. The method of claim 4, further comprising:
- determining, after ramping up the active power, whether the electrical grid fulfills the weak grid criterion; and
- when the weak grid criterion is not fulfilled, setting the power plant controller to operate in a normal grid strength operating mode.

9. The method of claim 1, further comprising:
- when the grid voltage deviates beyond a second threshold voltage from the normal operating voltage, reducing the active power generated by each of the plurality of wind turbine generators to generate the reduced amount of active power.

10. The method of claim 1, wherein, when the grid voltage deviates beyond the threshold voltage, controlling the power plant controller to provide the second active power reference to the plurality of wind turbine generators prior to the plurality of wind turbine generators entering a fault ride-through mode.

11. The method of claim 10, further comprising:
- controlling the power plant controller to provide an indication to the plurality of wind turbine generators to exit the fault ride-through mode.

12. The method of claim 10, wherein a first wind turbine generator of the plurality of wind turbine generators is designated to represent a wind power plant fault ride-through state, and wherein the first wind turbine generator provides an indication to the power plant controller to exit the fault ride-through mode.

13. The method of claim 10, wherein during the fault ride-through mode the power plant controller freezes a plurality of controls and allows independent operation of each of the plurality of wind turbine generators.

14. The method of claim 10, wherein when a predetermined number of the plurality of wind turbine generators have exited the fault ride-through mode and the power plant controller remains in the fault ride-through mode, the power plant controller receives a communication from the plurality of wind turbine generators and the power plant controller exits the fault ride-through mode.

15. The method of claim 4, wherein any one of the threshold voltage, the second active power reference, the reduced amount of active power, and the ramp up rate is determined by an electrical site study.

16. The method of claim 1, wherein the deviation of the grid voltage from the normal operating voltage comprises a drop in voltage; and
- wherein the return to the normal operating voltage comprises a rise in voltage.

17. The method of claim 1, wherein the deviation of the grid voltage from the normal operating voltage comprises a rise in voltage; and
- wherein the return to the normal operating voltage comprises a drop in voltage.

18. A wind power plant coupled to an electrical grid, the wind power plant comprising:
- a plurality of wind turbine generators; and
- a power plant controller configured to control the plurality of wind turbine generators according to an operation, comprising:
  - a first active power reference provided by the power plant controller to the plurality of wind turbine generators;
  - determining whether the electrical grid fulfills a weak grid criterion;
  - when the weak grid criterion is fulfilled, setting the power plant controller to operate in a weak grid mode, wherein operating the power plant controller to operate in the weak grid mode comprises:
    - when a grid voltage deviates from a normal operating voltage beyond a threshold voltage, and before the grid voltage begins to return to the normal operating voltage, providing a second active power reference to the plurality of wind turbine generators, wherein the second active power reference is less than the first active power reference; and
    - when the electrical grid recovers from the voltage deviation, controlling each wind turbine generator of the plurality of wind turbine generators to generate a reduced amount of active power based on the second active power reference.

19. A computer program product directly loadable into an internal memory of at least one digital computer of a wind power plant, the wind power plant coupled to an electrical grid and comprising a plurality of wind turbine generators, the computer program product comprising software code portions for performing an operation when the computer program product is run on the at least one digital computer, the operation comprising:
- providing a first active power reference to the plurality of wind turbine generators;
- determining whether the electrical grid fulfills a weak grid criterion;
- when the weak grid criterion is fulfilled and a grid voltage deviates from a normal operating voltage beyond a threshold voltage, and before the grid voltage begins to return to the normal operating voltage, providing an a second active power reference to the plurality of wind turbine generators, wherein the second active power reference is less than the first active power reference; and
- when the electrical grid recovers from the voltage deviation, controlling each wind turbine generator of the plurality of wind turbine generators to generate a reduced amount of active power based on the second active power reference.

* * * * *